(12) United States Patent
Bryson

(10) Patent No.: US 7,046,869 B2
(45) Date of Patent: May 16, 2006

(54) INTEGRATED CIRCUIT

(75) Inventor: Christopher C. Bryson, Cardiff (GB)

(73) Assignee: Phyworks Limited, (GB)

( * ) Notice: Subject to any disclaimer, the term of this patent is extended or adjusted under 35 U.S.C. 154(b) by 91 days.

(21) Appl. No.: 10/442,825

(22) Filed: May 20, 2003

(65) Prior Publication Data

US 2004/0213504 A1 Oct. 28, 2004

(30) Foreign Application Priority Data

Apr. 28, 2003 (GB) .................................. 0309608.8

(51) Int. Cl.
*G02B 6/12* (2006.01)
*H03M 13/00* (2006.01)

(52) U.S. Cl. .......................................... 385/14; 341/89
(58) Field of Classification Search ................. 341/89, 341/100, 101; 385/14
See application file for complete search history.

(56) References Cited

U.S. PATENT DOCUMENTS

| 4,227,075 A | 10/1980 | Holland | |
| 4,703,471 A * | 10/1987 | Fitelson et al. | 398/43 |
| 5,237,441 A | 8/1993 | Nhu | |
| 6,121,906 A * | 9/2000 | Kim | 341/100 |
| RE36,886 E * | 10/2000 | Ishibashi et al. | 385/92 |
| 2002/0021468 A1 | 2/2002 | Kato et al. | |
| 2003/0218923 A1 * | 11/2003 | Giaretta et al. | 365/200 |

FOREIGN PATENT DOCUMENTS

| EP | 476444 A1 | 3/1992 |
| WO | WO 01/52454 A1 | 7/2001 |

* cited by examiner

*Primary Examiner*—Sarah Song
(74) *Attorney, Agent, or Firm*—Lahive & Cockfield, LLP

(57) ABSTRACT

An integrated circuit can operate in a first mode as a parallel-to-serial converter, and in a second mode as a serial-to-parallel converter. Some of the components of the integrated circuit are used in both modes. For example, the IC has a single parallel interface, which is used as a parallel input in the first mode, and as a parallel output in the second mode. Further, the IC includes a single phase-locked loop circuit, which is used in a clock multiplier unit in the first mode, and in a clock recovery circuit in the second mode.

11 Claims, 3 Drawing Sheets

INTEGRATED CIRCUIT

This invention relates to an integrated circuit, and in particular to an integrated circuit which can be used in both a transmitter and a receiver within a communication system.

In the case of an optical communications system, data can be transmitted in series at high data rates over a communications medium, for example an optical fibre. However, the electronic data processing devices, which act on the data before transmission and after reception, can more easily be designed to process the data in parallel, at a lower processing rate.

Therefore, a transmitter, for use in a communications system, typically incorporates a parallel-to-serial converter integrated circuit, for taking the data in parallel form, and converting it to serial form. Similarly, receivers in such communication systems typically include serial-to-parallel converter integrated circuits, which take the received data in serial form, and convert it to parallel form for further processing in the associated electronic circuitry.

This creates a need for two different types of integrated circuit, which, although they contain some common components, must be separately designed, tooled, manufactured, and packaged. Since these steps account for a large part of the cost, it can be more cost-effective to provide a single integrated circuit, which can provide both required functions.

According to the present invention, there is provided an integrated circuit, which can operate in a first mode as a parallel-to-serial converter, and in a second mode as a serial-to-parallel converter.

This has the advantage that a large part of the non-recurring expenditure of an integrated circuit can in effect be shared between two devices.

For a better understanding of the present invention, and to show how it may be put into effect, reference will now be made, by way of example, to the accompanying drawings, in which.

DETAILED DESCRIPTION OF PREFERRED EMBODIMENTS

Figure 1:
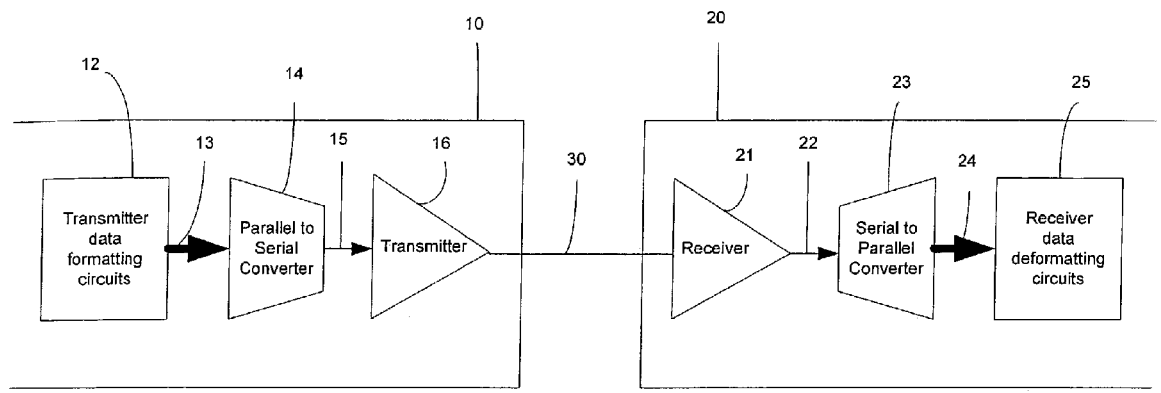
FIG. 1 is a block schematic diagram of a communication system in accordance with an aspect of the present invention.

FIG. 1 is a block schematic diagram of a communications system in accordance with the invention.

The system includes a transmitter 10 and a receiver 20, which are in communication over a transmission medium 30, which in this illustrated embodiment takes the form of a fibre optic cable.

Within the transmitter 10, there are electronic circuits 12, which perform the required data processing and data formatting operations on input electronic data, to put them into a form suitable for transmission. For example, the electronic circuits 12 may perform any required error correction encoding.

The electronic circuits 12 operate on the data in parallel. Thus, for example, if data is to be transmitted across the optical fibre 30 at a data rate of 10 Gbps, the electronic circuits 12 may operate on the data in, for example, 16 bit parallel form, at a rate of 622 Mbps.

The output data from the electronic circuits 12 are then supplied across a conventional parallel interface 13 to an integrated circuit 14, which acts as a parallel-to-serial converter, which will be described in more detail below.

The resulting output data are supplied across a serial interface 15 to an optoelectronic transmitter device 16 which, amongst other things, converts the electronic signals into optical signals for transmission over the optical fibre 30.

Within the receiver 20, the received optical signals from the optical fibre 30 are supplied to an optoelectronic receiver device 21, which, amongst other things, converts the received optical signals into electronic signals.

These electronic signals are supplied over a serial interface 22 to an integrated circuit 23, which acts as a serial-to-parallel converter. The structure and operation of the serial-to-parallel converter 23 will be described in more detail later. The output data from the serial-to-parallel converter 23 are supplied over a conventional parallel interface 24 to electronic circuits 25, which provide the required data deformatting and processing circuitry. For example, when the transmitter 10 includes error correction encoding circuitry, the data deformatting and processing circuitry includes the corresponding error correction decoder.

In accordance with the present invention, the parallel-to-serial converter 14 and the serial-to-parallel converter 23 are identical integrated circuits, operating in different modes.

Figure 2:
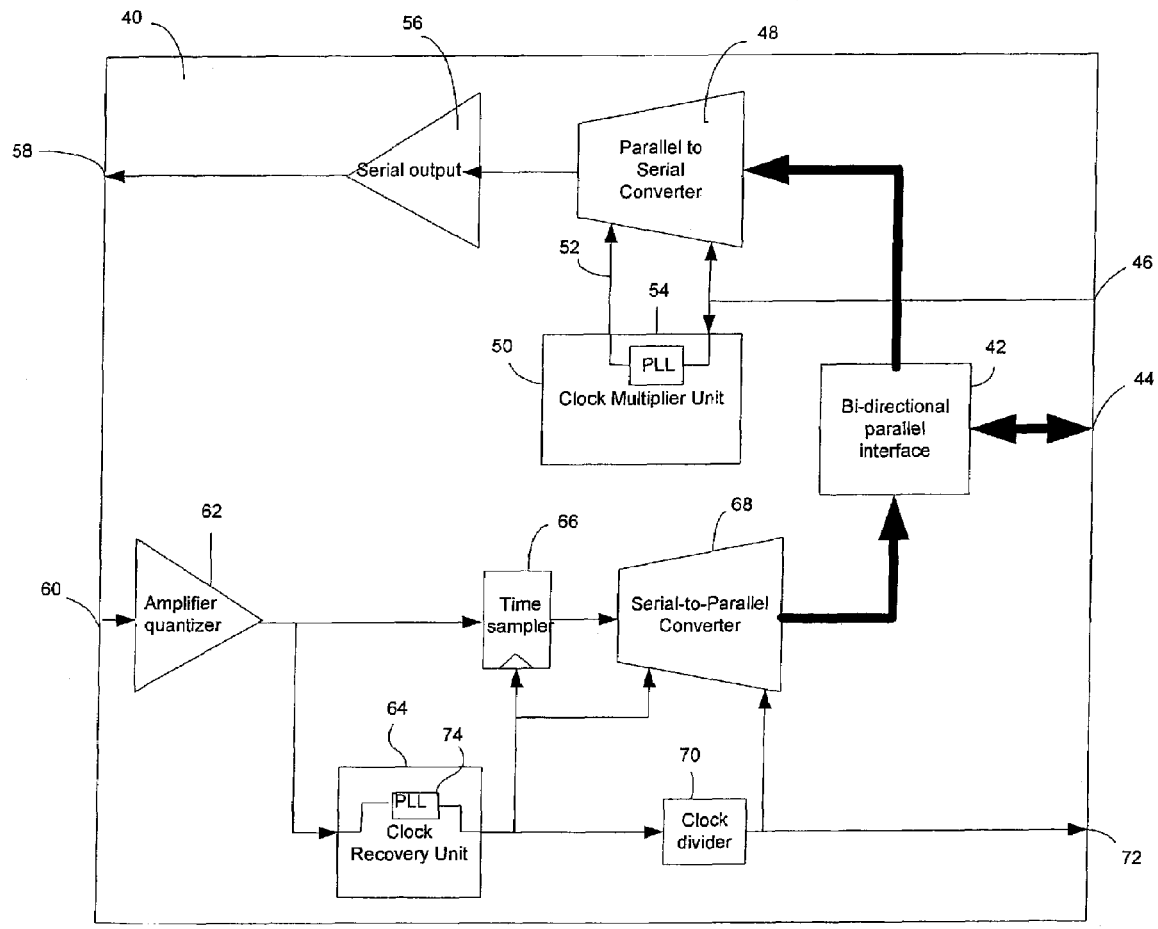
FIG. 2 is a block schematic diagram of an integrated circuit in accordance with the invention.

FIG. 2 is block schematic diagram of a suitable integrated circuit, which is usable either as a parallel-to-serial converter or as a serial-to-parallel converter, in conjunction with electrical-optical and optical-electrical interface components.

The integrated circuit 40 contains a bi-directional parallel interface 42, which is connected to parallel interface pins 44 on the integrated circuit.

In a preferred embodiment of the invention, the device is intended for use with a 10 Gbps optical transmission medium, and with electronic circuitry operating at 622 Mbps, and the parallel interface 42 is thus a 16-bit parallel interface. However, 4-bit parallel representations are also widely used, and the parallel interface 42 may therefore be a 4-bit parallel interface, or indeed may be of any required width.

In the preferred embodiment of the invention, each bit of the parallel interface 42 is implemented as a differential signal pair, and so there are two pins 44 for each bit. Thus, in the case of a 16-bit parallel interface, there are a total of 32 pins.

When the device 40 is used in a transmitter, it receives parallel data from the input pins 44, and also receives a clock signal, which is synchronous with the parallel data input, on an input 46.

The parallel data is transferred to a parallel-to-serial converter 48, which may be of generally conventional form. Thus, the parallel-to-serial converter 48 multiplexes the data on the parallel input lines onto its serial output line sequentially. The parallel-to-serial converter 48 operates under the control of a clock multiplier unit 50, which receives the clock signal from the clock input 46, and outputs a clock signal on line 52 at the required serial data output frequency. Thus, the clock multiplier unit 50 multiplies the frequency of the received clock signal by a multiplication factor, which is equal to the number of bits in the parallel interface 42.

Preferably, the clock multiplier unit 50 includes a phase-locked loop 54, which can be used to synthesize the line rate clock signal for output on line 52 from the synchronous clock signal received from the input 46.

The clock multiplier unit is adapted to meet the requirements of the optical communications system which is in use. For example, if the device is intended for use in an optical communications system based on the SONET standard, this will require that the clock multiplier unit must for example meet specific performance criteria regarding jitter.

The output from the parallel-to-serial converter 48 is supplied to a serial output device 56, for example in the form of a CML buffer, and the output data is then supplied on a serial data output 58.

In fact, in the preferred embodiment, each bit of the output serial data is also implemented as a differential signal pair, and so there are two data output pins 58.

When the device 40 is operating as a serial-to-parallel converter, serial data at, for example, 10 Gbps is received on a serial data input 60. In the preferred embodiment, each bit of the input serial data is also implemented as a differential signal pair, and so there are two data input pins 60.

The input serial data is supplied to an amplifier/quantizer device 62. In this illustrated embodiment, the amplifier/quantizer device 62 is provided on the integrated circuit 40. However, it is also possible that the amplifier/quantizer device could be provided on a separate integrated circuit, with its output supplied to the integrated circuit 40.

The output from the amplifier/quantizer device 62 is supplied to a clock recovery unit 64, which includes a phase-locked loop 74. The clock recovery unit is adapted to meet the requirements of the optical communications system which is in use. For example, if the device is intended for use in an optical communications system based on the SONET standard, this will require that the clock recovery unit must for example meet specific performance criteria regarding filtering out jitter.

The recovered clock signal is supplied to a time sampler 66, which also receives the output signals from the amplifier/quantizer 62, and supplies an input signal to a serial-to-parallel converter 68. The recovered clock signal is also supplied to the serial-to-parallel converter 68, both directly and through a clock divider 70, the latter dividing the recovered clock signal by a division factor which is equal to the number of bits in the parallel interface 42 to generate a divided clock signal at the rate of the parallel data output.

The output divided clock signal is therefore supplied to an output pin 72. The serial-to-parallel converter 68 demultiplexes the serial data in round-robin fashion onto its parallel output, and the parallel data output from the serial-to-parallel converter 68 is supplied to the bidirectional parallel interface 42, and thereafter to the parallel data output pins 44.

The amplifier/quantizer circuit 62 amplifies the received input signals until they are at a suitable signal level, and then applies instantaneous comparison with a threshold. The time sampler 66 then uses the recovered clock signal to sample the resulting quantized waveform at discrete time points, once per bit period, in order to determine whether the instantaneous received waveform is more likely to represent a transmitted binary 1 or 0, and hence to recover the transmitted data sequence.

Thus, the integrated circuit 40 can operate either as a parallel-to-serial converter, or as a serial-to-parallel converter. The mode of operation is determined by identifying how the device is connected to other circuits.

For example, the device may be configured to operate as a parallel-to-serial converter only if connections are made to the clock input 46 and serial data output pin 58, and to operate as a serial-to-parallel converter only if connections are made to the serial data input pin 60 and synchronous clock output pin 72.

Alternatively, the device 40 may be provided with one or more specific control input pins (not shown), which receive a control signal indicating whether the device is to operate as a parallel-to-serial converter or as a serial-to-parallel converter, and which activate the required blocks within the device 40 accordingly.

The integrated circuit may be supplied to users in a form which allows the users to configure it for use either as a parallel-to-serial converter or as a serial-to-parallel converter, or it may be supplied to users already configured for one of those uses.

Figure 3:
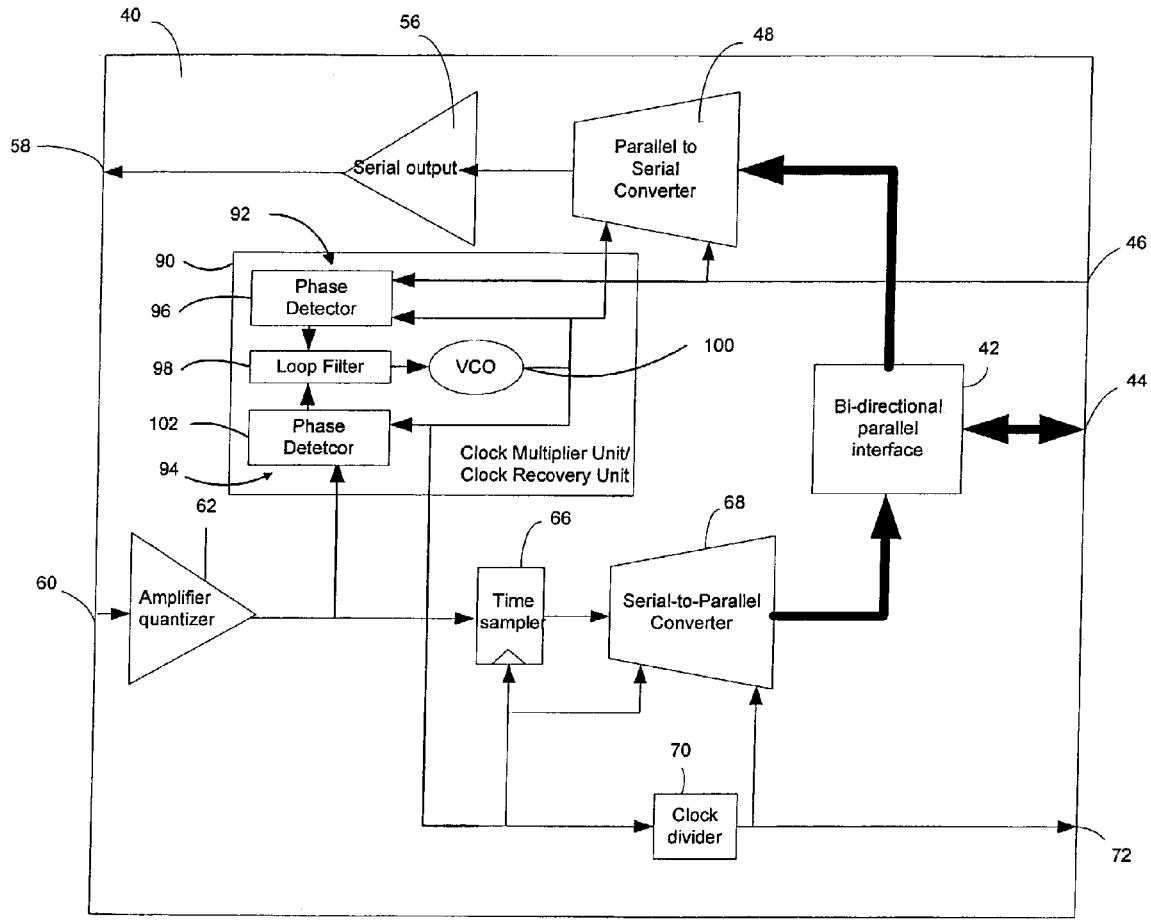
FIG. 3 is a block schematic diagram of a second integrated circuit in accordance with the invention.

FIG. 3 is a block schematic diagram of an alternative form of integrated circuit in accordance with the invention, in which further components are used both when the device is operating as a parallel-to-serial converter and when it is operating as a serial-to-parallel converter.

In the circuit of FIG. 3, components which have the same functions as components of FIG. 2 are indicated by common reference numerals, and will not be described further herein. In the circuit of FIG. 3, elements are shared between the Clock Multiplier Unit and Clock Recovery Unit, which is shown as a single block 90.

More specifically, the combined Clock Multiplier Unit and Clock Recovery Unit 90 includes a first phase locked loop 92, which is used in the Clock Multiplier Unit when the device is operating as a parallel-to-serial converter, and a second phase locked loop 94, which is used in the Clock Recovery Unit when the device is operating as a serial-to-parallel converter.

Thus, the first phase locked loop 92 includes a first phase detector 96, a loop filter 98, and a voltage-controlled oscillator 100. The second phase locked loop 94 includes a second phase detector 102, but shares the loop filter 98 and the voltage-controlled oscillator 100 with the first phase locked loop 92.

This saves space on the chip by using the voltage-controlled oscillator 100 in both phase locked loops 92, 94, while ensuring that the Clock Multiplier Unit and Clock Recovery Unit operations can be provided with the required functionality.

There is thus provided an integrated circuit which can provide two functions.

What is claimed is:

1. An integrated circuit, for use in optical communications systems, operable in a first mode as a parallel-to-serial converter for converting parallel data to serial data for optical transmission, and operable in a second mode as a serial-to-parallel converter for converting serial optically transmitted data to parallel data, comprising:
    a clock input, for receiving a first clock signal synchronous with parallel data in said first mode;
    a clock multiplier, for multiplying the first clock signal by a multiplication factor to obtain a second clock signal at a data rate of output serial data in said first mode, the clock multiplier comprising a first phase-locked loop;
    a clock recovery unit, for recreating a third clock signal from received serial data in said second mode, the clock recovery unit comprising a second phase-locked loop; and
    a clock divider, for dividing the third clock signal by a division factor to obtain a fourth clock signal at a data rate of output serial data in said second mode;
    wherein said first and second phase-locked loops share at least some components.

2. An integrated circuit as claimed in claim 1, comprising a single parallel interface, which is operable as a circuit input in said first mode, and as a circuit output in said second mode.

3. An integrated circuit as claimed in claim 2, comprising at least one first pin, which is operable as a circuit output in said first mode, and at least one second pin, which is operable as a circuit input in said second mode.

4. An integrated circuit as claimed in claim 2, wherein the parallel interface comprises a plurality of pairs of pins, such that input or output parallel data is represented as differential data.

5. An integrated circuit as claimed in claim 3, comprising a pair of first pins, for supplying output data as differential data, and a pair of second pins, for receiving input data as differential data.

6. An integrated circuit as claimed in claim 2, wherein said parallel interface carries 16-bit parallel differential signals.

7. An integrated circuit as claimed in claim 2, wherein said parallel interface carries 4-bit parallel differential signals.

8. An integrated circuit as claimed in claim 1, wherein said first and second phase-locked loops share a common voltage-controlled oscillator, but include respective different phase detectors.

9. An integrated circuit as claimed in claim 8, wherein said first and second phase-locked loops share a common loop filter.

10. An integrated circuit as claimed in claim 1, comprising a control input, wherein the circuit operates either in said first mode or in said second mode, based on a signal received on said control input.

11. An optical communications system, comprising:

a transmitter, for receiving parallel data, and supplying output serial data to an optical transmission medium, and including a parallel-to-serial converter; and a receiver, for receiving serial data from the 10 optical transmission medium, and supplying output parallel data, and including a serial-to-parallel converter;

wherein the parallel-to-serial converter is a first integrated circuit operating in a first mode, and wherein the serial-to-parallel converter is a second integrated circuit, identical to the first integrated circuit, operating in a second mode, the first and second integrated circuits each comprising:

a clock input, for receiving a first clock signal synchronous with parallel data in said first mode;

a clock multiplier, for multiplying the first clock signal by a multiplication factor to obtain a second clock signal at a data rate of output serial data in said first mode, the clock multiplier comprising a first phase-locked loop;

a clock recovery unit, for recreating a third clock signal from received serial data in said second mode, the clock recovery unit comprising a second phase-locked loop; and a clock divider, for dividing the third clock signal by a division factor to obtain a fourth clock signal at a data rate of output serial data in said second mode;

wherein said first and second phase-locked loops share at least some components.

* * * * *